(No Model.) 2 Sheets—Sheet 1.
E. E. WOLF.
TRANSOM LIFTER.
No. 492,250. Patented Feb. 21, 1893.
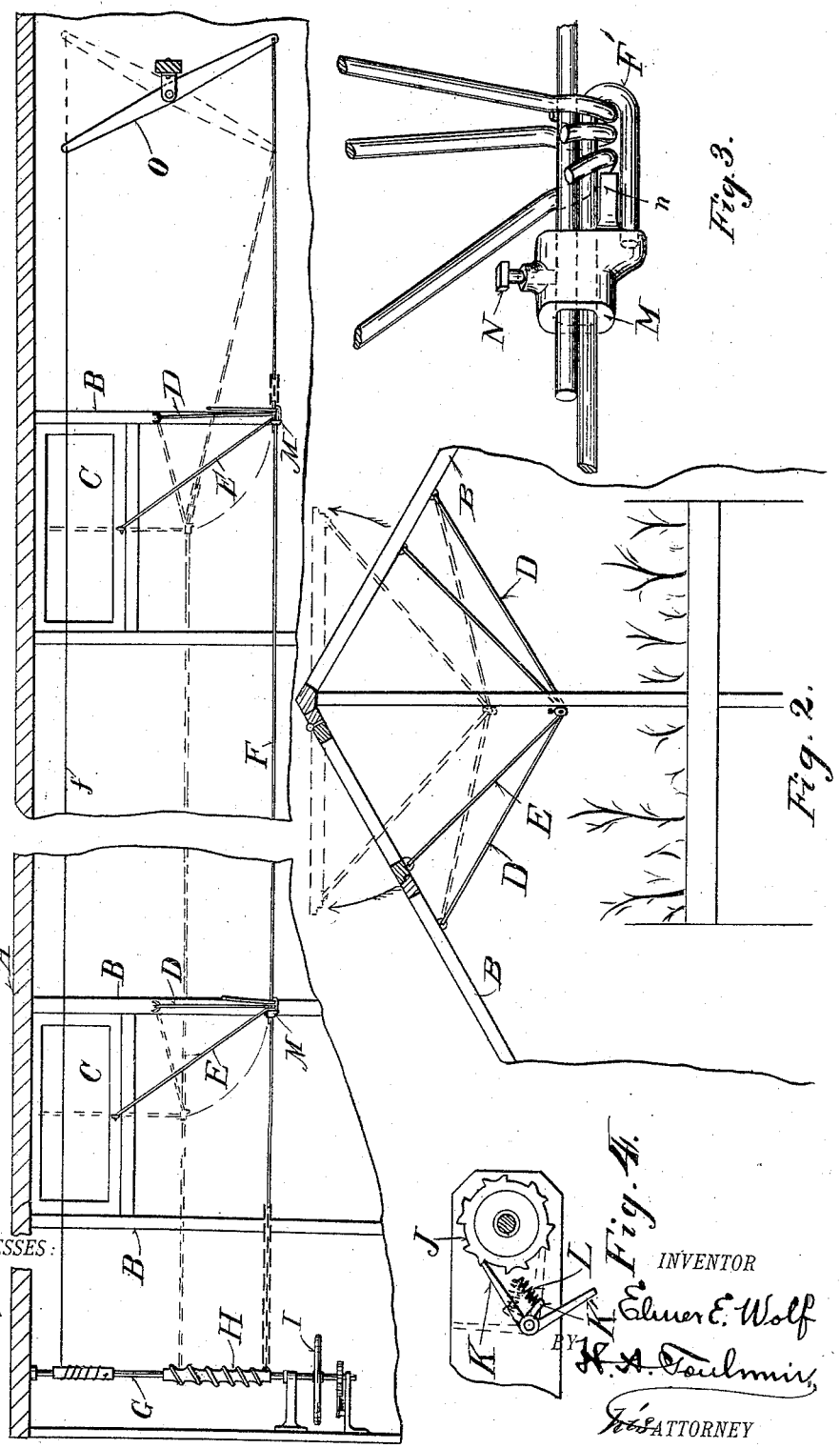
WITNESSES:
H. M. Plaisted
Fred Ernest
INVENTOR
Elmer E. Wolf
BY H. A. Toulmin
his ATTORNEY
THE NORRIS PETERS CO., PHOTO-LITHO., WASHINGTON, D. C.

(No Model.) 2 Sheets—Sheet 2.
E. E. WOLF.
TRANSOM LIFTER.
No. 492,250. Patented Feb. 21, 1893.
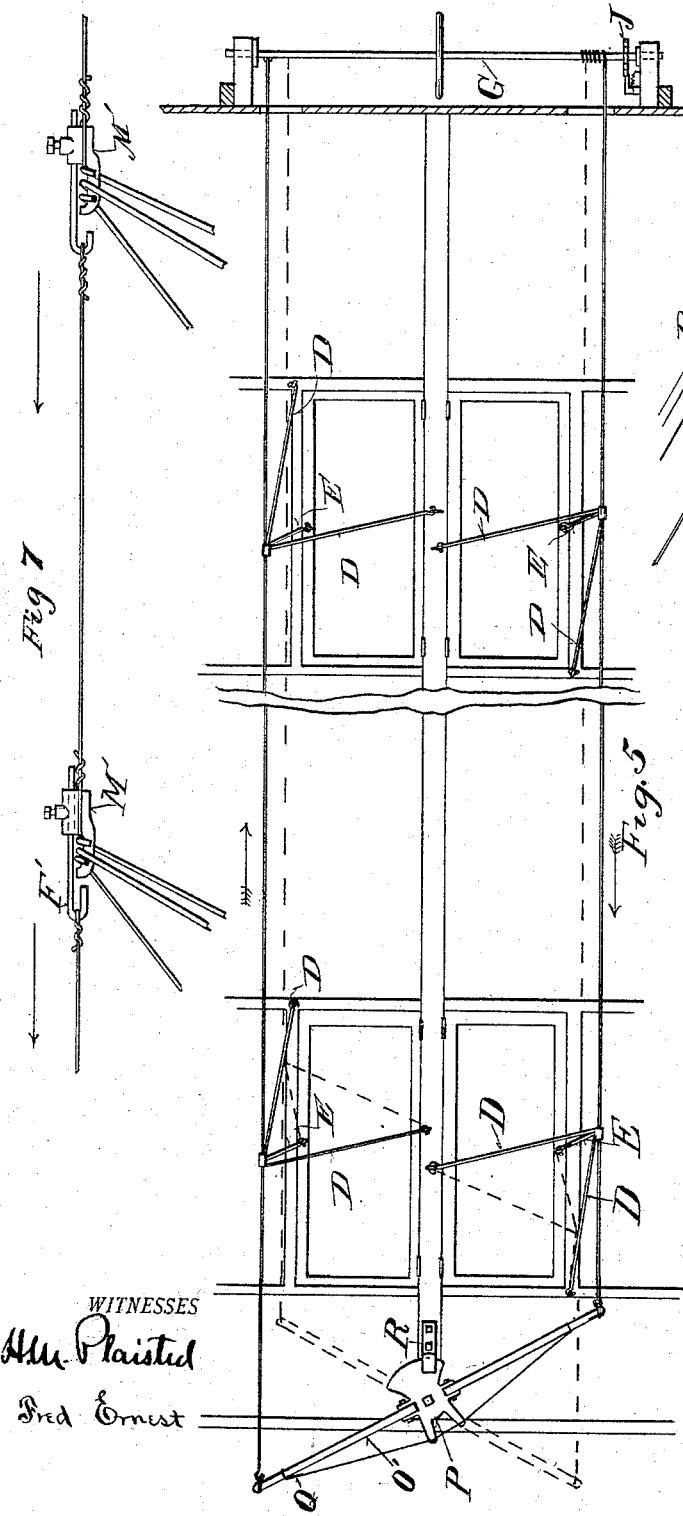
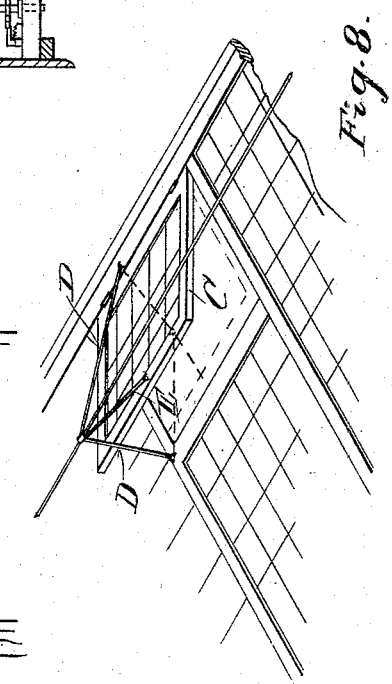
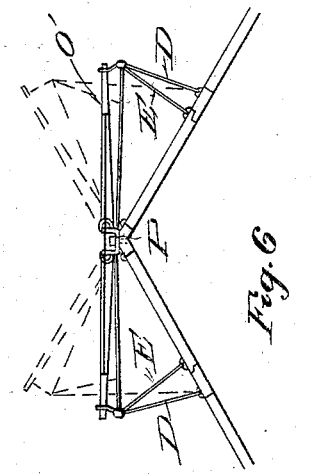
WITNESSES
INVENTOR
Elmer E. Wolf,
BY
HIS ATTORNEY

UNITED STATES PATENT OFFICE.

ELMER E. WOLF, OF SPRINGFIELD, OHIO.

TRANSOM-LIFTER.

SPECIFICATION forming part of Letters Patent No. 492,250, dated February 21, 1893.

Application filed September 17, 1892. Serial No. 446,220. (No model.)

*To all whom it may concern:*

Be it known that I, ELMER E. WOLF, a citizen of the United States, residing at Springfield, in the county of Clark and State of Ohio, have invented certain new and useful Improvements in Sash-Operating Mechanism, of which the following is a specification, reference being had therein to the accompanying drawings.

My invention relates to certain new and useful improvements in sash operating mechanism, the same being especially adapted for use in green houses, and other places where a long series of sashes are to be operated.

My improvements have reference to a triangular arrangement of rods connected to a series of sashes and to each other whereby they may be operated simultaneously to raise the sashes; have reference to a pair of pivoted supporting rods meeting at a common point, and connection from such point to the adjacent sash and a main rod or line adjustably connecting each set of supporting and connecting rods; have reference to a return wire or line operating with the main rod to secure the sashes in their lowered position; have reference to a self adjusting lever arrangement, operating with said windlass, to compensate for the raising and lowering of the main and return line; and have reference to details of construction and arrangement hereinafter fully described and specifically claimed.

The object of my improvements is to provide a simple and effective mechanism for operating a long line of sashes uniformly and simultaneously, without regard to the length of the series; also to operate sashes swinging in opposite directions, from one main line or rod; also to raise said sashes from below or from above as the circumstances and exigencies of the case may require, and to secure the sashes in their closed position as well as to adjust them to any desired amount of opening,—the whole series of sashes being operated uniformly and simultaneously by my arrangement and construction. With these ends in view I have shown my mechanism applied to the sashes of a green-house, and operating from above as well as from below.

In the accompanying drawings on which like reference letters indicate corresponding parts:

Figure 1, represents a longitudinal section through the ridge-pole of a green house, showing my arrangement applied to the sashes from below; Fig. 2, a cross section of a green-house, the dotted lines indicating the sashes and lifting mechanism raised; Fig. 3, a detail perspective view of a portion of the main rod and the adjustable connection therefor, and the meetings ends of the operating rods and sash-connecting rod; Fig. 4, a detail plan view of a ratchet and double pawl for the windlass; Fig. 5, a plan view of a green-house with my device applied to the outside thereof; Fig. 6, an end view of the same showing the self adjusting levers; Fig. 7, a detail of the main rod and adjustable connection for the outside; and Fig. 8, a perspective view of a sash raised, and its lifting mechanism.

The letter A designates the ridge pole of a green-house, the letters B, the cross strips of the frame work, and the letters C the sashes mounted in said frame work and pivoted near the ridge-pole in this form. They are sometimes otherwise arranged, but this does not affect the principle of my invention.

Adjacent to each sash, and preferably at one side thereof, as illustrated, are pivotally supported a pair of operating rods D meeting at a common point, and hung to the cross pieces B at their outer ends, as shown in Fig. 2. This construction is for the preferred lower arrangement in which the sashes are raised from below. I will first describe this form, and then show its applicability to the upper arrangement described in Figs. 5 to 8 inclusive. The meeting point of the operating rods D is out of the line through the supporting points, and can thus oscillate back and forth in the arc of a circle. A connecting rod E connects the said meeting point with the adjacent sash at its opening edge. When the operating rods are swung forward, as indicated in Fig. 1, the connecting rod raises the sash. The sash is at one side of the meeting point, but the triangular arrangement of the rods braces the connecting rod against any lateral thrust.

A main rod or line F, adjustable, as will be described, secures all the operating rods together, and the chain or rope at one end is wound on a windlass shaft G, having a worm H, and the hand wheel I. A ratchet J secured to the shaft is provided with a double-armed pawl K, having a spring L,—one end fixed in a line between the center of the pawl and the shaft, and the other end acting on a projection K' from said pawl, to effect an engagement of one arm or the other of the pawl, with the ratchet wheel. The adjustability of the main line is effected by forming the same in sections, and coupling each two of them by a collar M having a set screw N, Fig. 3. The end of one section of the line is turned over to form a loop F' Fig. 3, and fits in a socket. The end of the adjacent section slips through the collar under the set screw and is secured in place by the latter. The operating rods are bent in hooks through the loop F' as shown in Fig. 3, and a projection n, from the casting maintains them at one end of the loop. The main line may thus be adjusted at any part of its length to close the sashes completely, and thus act uniformly thereon. This is an important practical point. The main line F may be rigid, as when formed by a rod, or may be flexible. In the latter case, when operated from one end only, it will not secure the sashes in their lower position. To do this I effect a pull on the connecting rods E, by means of a return line wire f, operating reversely to the main line, and thus winding up on the windlass shaft as fast as the main line unwinds; and vice versa. The opposite ends of the main and the return line, are respectively secured to a lever O; or the windlass arrangement may be duplicated at the said ends. A pull is thus exerted on the rods E, to hold the sashes down, and a thrust in order to raise the sashes.

As seen by Fig. 2, the main line may be located at one side of the center, to clear the supporting center posts of the green-house. The upward swing of the operating rods will raise this main line, as shown by the dotted position of the same in Fig. 1. The worm H is therefore preferably employed to carry the end of the line upward as the same is operated.

Referring now to Fig. 5, it will be seen that the operating rods D are mounted on the outside of the frame of the house, one being pivoted at the ridge pole and the other to one of the cross strips or rafters. The points of attachment are not in line with each other but one is thrown to the rear. The object of this is to bring the meeting point out beyond the edge of the sash, as seen in the plan view, Fig. 5, so that in swinging upward and raising the sash by the connecting rod E, the outer operating rod will clear the outer edge of the sash when it reaches the raised position as shown in Fig. 8. This arrangement also shortens the length of the operating rods. The connecting rod E is nearly perpendicular to the sash when the sash is lowered, and thus braces it against opening; when the sash is raised the connecting rod is inclined while the outer operating rod D is nearly perpendicular to its supporting frame, as seen in Fig. 8, and thus is in the best position to support the sash. The windlass shaft G is horizontal in Fig. 5, instead of vertical as in Fig. 1, and the return wire on the other end of the shaft is used as a main line by which the sashes on the other side of the ridge-pole are operated. The operating rods in this arrangement, are reversely inclined, so that the main line connected by the lever and windlass at opposite ends, travels in reverse directions, as indicated by the arrows, yet effects a raising or a lowering of all the sashes simultaneously.

When the sashes at the end of the series are near the end of the house, as shown in Fig. 5, the raising and lowering of the main line, as shown by Fig. 6, require a self adjusting lever to facilitate its working. As shown in Figs. 5 and 6, this lever O' consists of a pivoted plate P to which are secured arms Q, suitably stayed and pivoted in rings or lugs on said plate, which allow of their operating up and down as the main wire changes its elevation. A segmental flange on the plate P is engaged by a clamping piece R as seen in Fig. 5.

In Fig. 7 it will be seen that the coupling collar M' is provided with a hook projection to which the operating and connecting rods are directly attached instead of to the loop F' of the main line, which in this case is adjustable within the casting by means of a set screw acting thereon. The coupling collar and the annexed loop are connected together by a wire to illustrate the flexible main line. The hook portion of the coupling collar being below the axis line, the casting will be maintained in its edgewise position by the bent over ends of the rods, as shown in Fig. 7, and the distance between the collars may be varied by adjusting the loop F' back and forth therein. Thus in this form, as well as the form previously described, the connecting rod E for each sash, receives a pull and a thrust, acting on the sash in opposite directions according to the direction of motion of the main line. The sash may thus be raised or lowered as desired, and all acted on simultaneously and uniformly. The main line may be formed by a rod or wire, the same being either in sections or flexible, and the term "main line" including wire rope, rods or other connections suitable for such purpose as herein set forth and described.

Having thus fully described my invention, what I claim as new, and desire to secure by Letters Patent, is—

1. The combination with a main line or rod formed in sections, one end of a section being bent in the form of a loop and the adjacent end of the next section lapping by said loop, of a coupling collar adapted to slip over said overlapping ends and having a socket to receive the end of the loop of one section and close the loop, and a clamping set screw in said collar to screw the said overlapping ends therein.

2. The combination with a swinging sash and a supporting frame work, of a pair of inclined rods meeting at a common point, and adapted to oscillate or swing about their points of support, and an inclined connecting rod between said sash and said meeting point.

3. The combination with a series of swinging sashes, of an operating mechanism for each sash consisting of a set of operating rods inclined toward each other and pivotally mounted adjacent to each sash and a connection from the sash to said operating rods, and a main line connecting each of said operating mechanisms to operate the series simultaneously.

4. The combination with a series of swinging sashes, of a pair of operating rods adjacent to each sash and meeting at a common point and adapted to oscillate about their points of support, a connecting rod from each meeting point to the adjacent sash, a main line adjustable in length between two sashes, another line acting in the reverse direction and adapted to serve as a return line, and means to operate said main and return line simultaneously, whereby a uniform and simultaneous action of said sashes is secured.

5. The combination with a series of sashes, of a rigid main line or rod adjacent to said series, operating rods meeting at a common point and pivotally mounted at their outer ends, thereby constituting a triangle and bracing the main line with which they are engaged, and a connecting rod from each sash to said main line, whereby a positive thrust or pull is exerted on said sash according to the direction in which said line is operated, and means to operate said line in both directions.

6. The combination with a series of sashes, of a main line running along adjacent to said series, a pair of operating rods operatively connected at a common point to said main line, and pivoted at their other ends to adapt them to oscillate, an inclined rod connecting each sash with said main line and acting to raise and lower the sash, a windlass at one end of the main line, a double-armed lever supporting the other end by one arm, and a return wire connecting the other arm of said lever with said windlass, for the purpose described.

7. The combination with a double series of sashes, of a main line running down one series and back by the other adjacent series, a windlass at one end and a self adjusting lever at the other end of said double series, whereby the main line will travel in opposite direction in each series, and a triangular arrangement of rods operatively connecting each sash to the main line for the purpose described.

8. The combination with the meeting ends of rod sections forming a main line, one end being bent in the form of a loop, of a coupling-collar sliding over said ends and having a projection extending into the loop, and provided with a set screw to clamp the said rods in position.

9. The herein described self-adjusting lever, the same consisting of a plate pivoted on a central axis as a fulcrum, arms pivoted on transverse axes to said plate, and stays for said arms, substantially as shown and described.

In testimony whereof I affix my signature in presence of two witnesses.

ELMER E. WOLF.

Witnesses:
H. M. PLAISTED,
WARREN M. MCNAIR.